United States Patent
Ma et al.

(10) Patent No.: US 12,204,674 B2
(45) Date of Patent: Jan. 21, 2025

(54) PERMISSION SETTING METHOD AND APPARATUS, DEVICE, AND MEDIUM

(71) Applicant: Beijing Zitiao Network Technology Co., Ltd., Beijing (CN)

(72) Inventors: Wenzong Ma, Beijing (CN); Liang Chen, Beijing (CN); Yingtao Liu, Beijing (CN); Wei Ren, Beijing (CN); Qiushuo Huang, Beijing (CN); Yuejiang Yuan, Beijing (CN); Hao Huang, Beijing (CN); Jianhui Wu, Beijing (CN); Yalong Zou, Beijing (CN); Linghui Zhou, Beijing (CN); Mengzhang Wu, Beijing (CN); Yanhui Zhao, Beijing (CN); Xinlei Guo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/493,628

(22) Filed: Oct. 24, 2023

(65) Prior Publication Data

US 2024/0070308 A1 Feb. 29, 2024

Related U.S. Application Data

(63) Continuation of application No. PCT/CN2022/085819, filed on Apr. 8, 2022.

(30) Foreign Application Priority Data

Apr. 26, 2021 (CN) .......................... 202110454125.1

(51) Int. Cl.
G06F 21/62 (2013.01)

(52) U.S. Cl.
CPC ................. *G06F 21/6218* (2013.01)

(58) Field of Classification Search
None
See application file for complete search history.

(56) References Cited

U.S. PATENT DOCUMENTS

| | | | | |
|---|---|---|---|---|
| 2011/0247051 | A1* | 10/2011 | Bulumulla | G06F 21/00 726/4 |
| 2012/0036209 | A1* | 2/2012 | Lewis | G06Q 10/10 709/204 |

(Continued)

FOREIGN PATENT DOCUMENTS

| | | |
|---|---|---|
| CN | 1617510 A | 5/2005 |
| CN | 102081710 A | 6/2011 |

(Continued)

OTHER PUBLICATIONS

International Search Report in PCT/CN2022/085819, mailed Jun. 16, 2022, 3 pages.

(Continued)

*Primary Examiner* — Brandon Hoffman
(74) *Attorney, Agent, or Firm* — Astute IP Law Group

(57) ABSTRACT

Embodiments of the present disclosure relate to a permission setting method and apparatus, a device, and a medium. The method includes: displaying a permission customization control, in response to a trigger operation on a permission setting object of task information, the permission setting object including a first information object and/or a second information object, the second information object being subordinate to the first information object; displaying a permission editing interface, in response to a trigger operation on the permission customization control, and receiving customization permission information via the permission editing interface; and displaying the customization permission information corresponding to the permission setting (Continued)

object. Therefore, a hierarchy structure based on the task information satisfies a setting need for content-based permission customization, and improves a permission management efficiency.

20 Claims, 6 Drawing Sheets

(56) References Cited

U.S. PATENT DOCUMENTS

| | | | |
|---|---|---|---|
| 2015/0019480 A1* | 1/2015 | Maquaire | G06F 16/2365 |
| | | | 707/609 |
| 2016/0070758 A1 | 3/2016 | Thomson et al. | |
| 2017/0132200 A1* | 5/2017 | Noland | G06F 40/186 |
| 2017/0329864 A1* | 11/2017 | Micucci | G06F 16/90 |
| 2020/0409543 A1 | 12/2020 | Imamura et al. | |
| 2021/0157978 A1* | 5/2021 | Haramati | G06F 40/177 |

FOREIGN PATENT DOCUMENTS

| | | | |
|---|---|---|---|
| CN | 102968599 A | 3/2013 | |
| CN | 105701398 A | 6/2016 | |
| CN | 106570406 A | 4/2017 | |
| CN | 107196915 A | 9/2017 | |
| CN | 108415988 A | 8/2018 | |
| CN | 109144620 A | 1/2019 | |
| CN | 109359441 A | 2/2019 | |
| CN | 109522705 A | 3/2019 | |
| CN | 109787957 A | 5/2019 | |
| CN | 110162994 A | 8/2019 | |
| CN | 110348184 A | 10/2019 | |
| CN | 110457891 A | 11/2019 | |
| CN | 110569266 A | 12/2019 | |
| CN | 110727930 A | 1/2020 | |
| CN | 110929273 A | 3/2020 | |
| CN | 111382418 A | 7/2020 | |
| CN | 111552671 A | 8/2020 | |
| CN | 111556052 A | 8/2020 | |
| JP | H07-56794 A | 3/1995 | |
| JP | H07-143978 A | 5/1995 | |
| JP | H07-239767 A | 9/1995 | |
| JP | H11-143978 A | 5/1998 | |
| JP | 2000259730 A | 9/2000 | |
| JP | 2000-315234 A | 11/2000 | |
| JP | 2006179009 A | 7/2006 | |
| JP | 2008046784 A | 2/2008 | |
| JP | 2011186818 A | 9/2011 | |
| JP | 2017182238 A | 10/2017 | |
| JP | 2020537212 A | 12/2020 | |

OTHER PUBLICATIONS

Notice of Decision to Grant for Chinese Patent Application No. 202110454125.1, mailed May 13, 2024, 9 pages.
Office Action for Chinese Patent Application No. 202110454125.1, mailed Mar. 14, 2024, 19 pages.
Office Action for Japanese Patent Application No. 2023-565363, mailed on Nov. 26, 2024, 34 pages.

* cited by examiner

PERMISSION SETTING METHOD AND APPARATUS, DEVICE, AND MEDIUM

PRIORITY INFORMATION

The present application is a continuation of PCT/CN2022/085819, filed on Apr. 8, 2022, which claims a priority to Chinese Patent Application No. 202110454125.1, titled "PERMISSION SETTING METHOD AND APPARATUS, DEVICE, AND MEDIUM" and filed on Apr. 26, 2021, the entire contents of which are incorporated herein by reference.

FIELD

The present disclosure relates to the field of computer front-end application technologies, and more particularly, to a permission setting method and apparatus, a device, and a medium.

BACKGROUND

With the development of computer technology, permissions need to be set for relevant content information in consideration of information security.

In the related art, permission management relies on setting a role permission for each user account. A permission is set and verified based on a role of a user. For example, a permission with a higher security level or the like is set for a user account playing an administrator role.

However, the above-mentioned method for setting permissions based on roles is functional-level permission setting, which cannot meet a permission management need in some scenarios.

SUMMARY

To solve the above technical problems or at least partially solve the above technical problems, the present disclosure provides a permission setting method and apparatus, a device, and a medium.

Embodiments of the present disclosure provide a permission setting method. The method includes: displaying a permission customization control, in response to a trigger operation performed by a user on a permission setting object of task information, the permission setting object including a first information object and/or a second information object, the second information object being subordinate to the first information object; displaying a permission editing interface, in response to that the user triggers a trigger operation on the permission customization control, and receiving and obtaining customization permission information inputted by the user via the permission editing interface; and displaying the customization permission information corresponding to the permission setting object.

The embodiments of the present disclosure further provide a permission setting apparatus. The apparatus includes: a first display module configured to display a permission customization control, in response to a trigger operation on a permission setting object of task information, the permission setting object including a first information object and/or a second information object, the second information object being subordinate to the first information object; an obtaining module configured to display a permission editing interface, in response to a trigger operation on the permission customization control, and receive customization permission information via the permission editing interface; and a second display module configured to display the customization permission information corresponding to the permission setting object.

The embodiments of the present disclosure further provide an electronic device. The electronic device includes a processor and a memory configured to store executable instructions of the processor. The processor is configured to read the executable instructions from the memory, and execute the executable instructions to implement the permission setting method according to the embodiments of the present disclosure.

The embodiments of the present disclosure further provide a computer-readable storage medium. The computer-readable storage medium stores a computer program. The computer program is configured to perform the permission setting method according to the embodiments of the present disclosure.

Technical solutions according to the embodiments of the present disclosure can provide the following advantages over the related art.

The permission customization control is displayed, in response to the trigger operation performed by the user on the permission setting object of the task information. The permission editing interface is displayed, in response to the trigger operation on the permission customization control. The customization permission information is received via the permission editing interface. The customization permission information corresponding to the permission setting object is displayed. Therefore, a hierarchical structure based on the task information satisfies a setting need for content-based permission customization, and improves a permission management efficiency.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the drawings, same or similar elements are denoted by same or similar reference numerals. It should be understood that the drawings are schematic, and elements and components are not necessarily drawn to scale.

DETAILED DESCRIPTION

Figure 1:
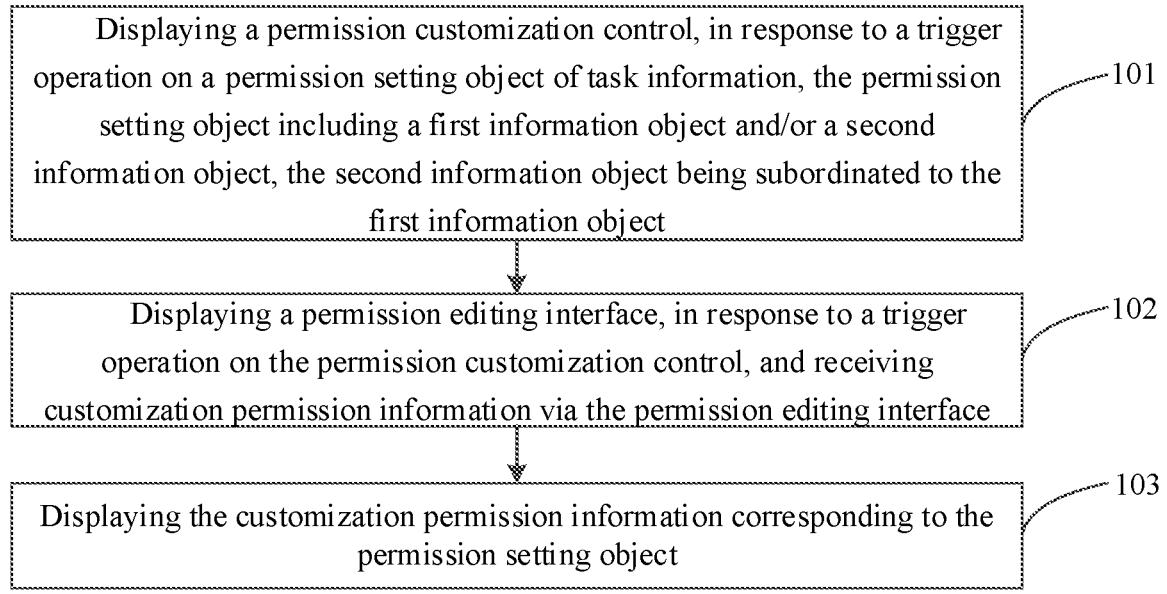
FIG. 1 is a schematic flowchart illustrating a permission setting method according to an embodiment of the present disclosure.

Embodiments of the present disclosure will be described in detail below with reference to the accompanying drawings. Although some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and embodiments of the present disclosure are only used for exemplary purposes, rather than to limit the protection scope of the present disclosure.

It should be understood that steps described in the method embodiments of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish different apparatuses, modules or units, rather than to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, rather than limiting the scope of these messages or information.

To solve the above problems, the embodiments of the present disclosure provide a permission setting method. With the method, on the one hand, permission management is performed based on contents, which meets a permission setting need at a content level. On the other hand, a permission is set based on a hierarchy structure of permission information, which flexibly satisfies setting of permissions for various levels of contents. In addition, permissions are set in a customization way, which further satisfies a need for diversified scenarios of content permission setting.

The method is described below in combination with specific embodiments.

FIG. 1 is a schematic flowchart illustrating a permission setting method according to an embodiment of the present disclosure. The method may be performed by a permission setting apparatus. The apparatus may be implemented in software and/or hardware, and may generally be integrated in an electronic device. As illustrated in FIG. 1, the method includes the following operations at blocks.

At block 101, a permission customization control is displayed, in response to a trigger operation on a permission setting object of task information. The permission setting object includes a first information object and/or a second information object. The second information object is subordinate to the first information object.

The task information may be any work information that can be hierarchically structured (such as enterprise reports and work plans), e.g., Objectives and Key Results (OKR) information.

Figure 2:
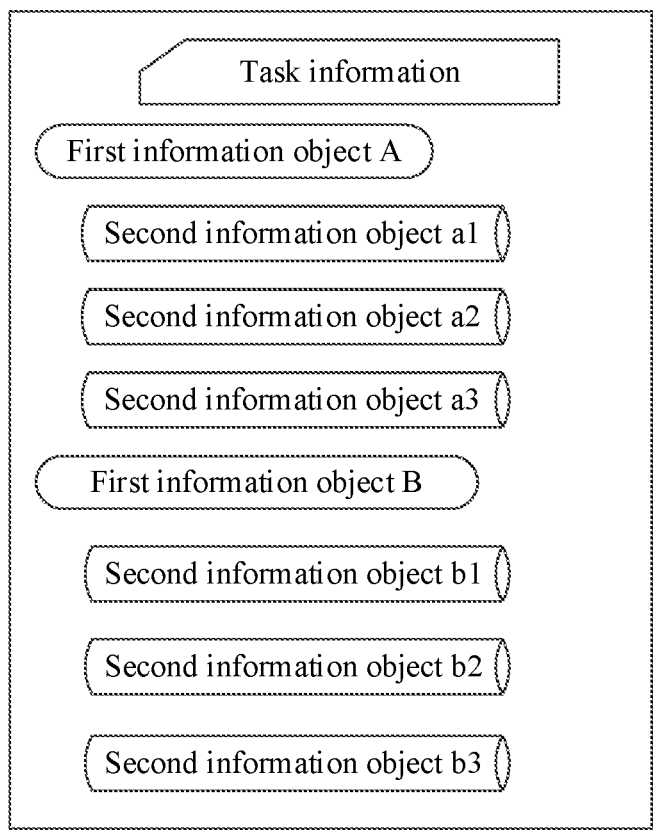
FIG. 2 is a schematic diagram showing an interface for a permission setting according to an embodiment of the present disclosure.

In the embodiment, permission setting information may include the first information object only, or the second information object only, or both the first information object and the second information object. As illustrated in FIG. 2, the second information object is subordinate to the first information object. In the embodiment, the permission customization control is displayed, in response to the trigger operation on the permission setting object of the task information.

Figure 3:
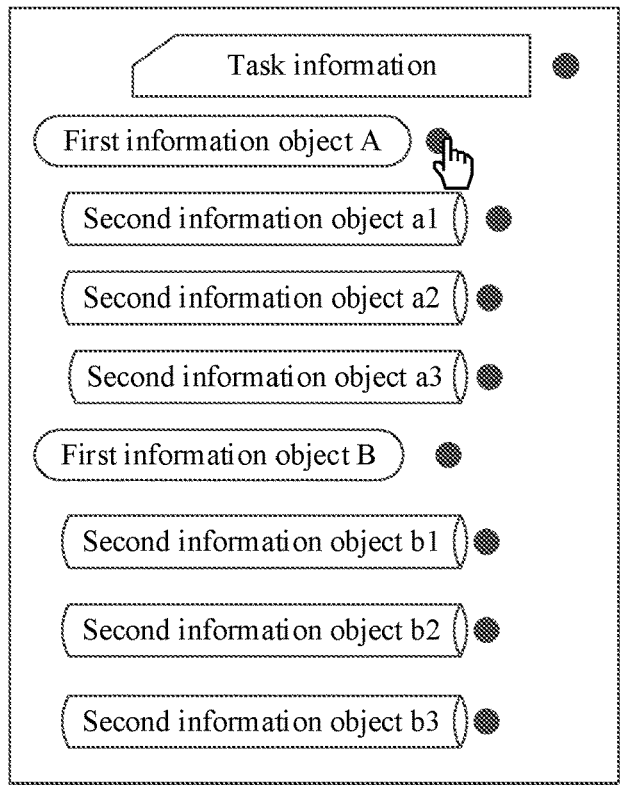
FIG. 3 is a schematic diagram showing an interface for another permission setting according to an embodiment of the present disclosure.

For example, when a hierarchy structure of the task information is as illustrated in FIG. 3, each of the first information objects and the second information objects is followed by a corresponding trigger control. When a trigger control is clicked, a permission customization control corresponding to the trigger control is displayed.

Figure 4:
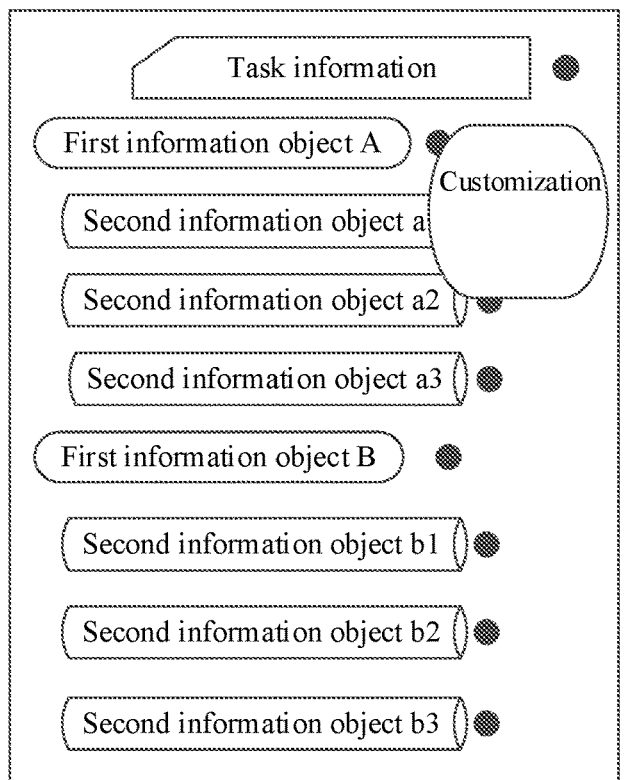
FIG. 4 is a schematic diagram showing an interface for yet another permission setting according to an embodiment of the present disclosure.

For example, when a user clicks on a trigger control behind a permission setting object "first information object A" in FIG. 3, a customization control for the permission setting object is displayed, as illustrated in FIG. 4.

At block 102, a permission editing interface is displayed, in response to a trigger operation on the permission customization control, and customization permission information is received via the permission editing interface.

In the embodiment, to facilitate the customization of relevant permissions and display of the corresponding permission editing interface subsequent to triggering of the permission customization control, the user may enter the customization permission information in the permission editing interface. The customization permission information includes, but is not limited to, a permission type (allowed to view, not allowed to view, or the like), a user corresponding to the permission type, etc.

Figure 5:
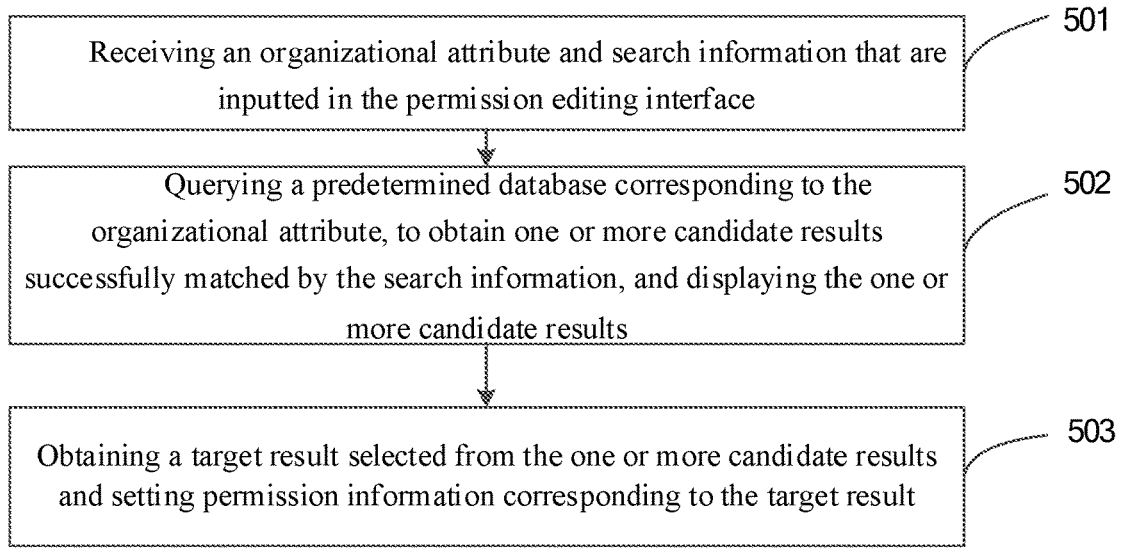
FIG. 5 is another schematic flowchart illustrating a permission setting method according to an embodiment of the present disclosure.

In an embodiment of the present disclosure, if management on a basis of the task information is organization-based, a customization permission is set based on the organizational attribute in the embodiment. As illustrated in FIG. 5, the receiving the customization permission information inputted by the user via the permission editing interface includes operations at blocks.

At block 501, an organizational attribute and search information that are inputted in the permission editing interface are received.

As mentioned above, the organizational attribute is an attribute of a management unit corresponding to the task information, e.g., a departmental attribute (electrical department, mechanical department, etc.), a group attribute (group 1, group 2, etc.), a work status attribute (employee, team, etc.), etc.

In addition, the search information refers to identifier information used to locate a specific user within each organizational attribute, e.g., a user's last name.

At block 502, a predetermined database corresponding to the organizational attribute is queried, to obtain one or more candidate results successfully matched by the search information, and the one or more candidate results are displayed.

It should be understood that a database corresponding to each organizational attribute is predetermined. The database includes a search result corresponding to the search information under the organizational attribute.

Therefore, in the embodiment, the predetermined database corresponding to the organizational attribute is queried, to obtain the one or more candidate results successfully matched by the search information, and the one or more candidate results are displayed. For example, when the search information is the user's last name, the one or more candidate results corresponding to the search information are all the users corresponding to the last name in the organizational attribute.

At block 503, a target result selected from the one or more candidate results is obtained and permission information corresponding to the target result is set.

In the embodiment, the target result selected from the one or more candidate results is obtained. For example, the candidate result triggered by the user is obtained as the target result, and the permission information corresponding to the target result is set.

For example, when "employee" is organizational attribute information, an identification of a current permission setting needs to be searched in all "employees". In a search information box corresponding to organizational information "employee", "Zhu" is entered as the search information, and three employees with the last name Zhu are searched out as candidate results. If the employee "Zhu San" in the candidate results selected out by the user is the target result, permission information corresponding to "Zhu San" is set.

The organizational attribute information and the corresponding search information in the above example are only illustrative. To facilitate understanding, description is made below with examples. For example, when "employee type" is the organizational attribute information, the current permission setting needs to be searched in all "employee types". For example, in the search information box corresponding to the organizational information, "internship", "regular", or the like is entered as the search information. For example, when "team" is the organizational attribute information, the current permission setting needs to be searched in all "teams". For example, when "Zhu" is entered as the search information in the search information box corresponding to the organizational information, all the team names containing "Zhu" are obtained.

At block 103, the customization permission information corresponding to the permission setting object is displayed.

In the embodiment, the customization permission information corresponding to the permission setting object is displayed, such that a relevant manager can intuitively understand permission information of the permission setting object.

Further, in an embodiment of the present disclosure, an authorization may be directly performed for the task information within a current cycle, based on the customization permission information. That is, the user is authorized for the task information within the current cycle based on the customization permission information. For example, when the customization permission information is "Zhu San can view", "Zhu San" is given a permission to view the task information within the current cycle. Thus, permission setting at a content level performed based on the hierarchical structure of the task information is realized.

In summary, with the permission setting method according to the embodiments of the present disclosure, the permission customization control is displayed, in response to the trigger operation performed by the user on the permission setting object of the task information. The permission editing interface is displayed, in response to the trigger operation on the permission customization control. The customization permission information is received via the permission editing interface. The customization permission information corresponding to the permission setting object is displayed. Therefore, the hierarchical structure based on the task information satisfies a setting need for content-based permission customization, and improves a permission management efficiency.

The permission setting object in the embodiment may be any object in the hierarchical structure based on the task information. Thus, permission setting needs can be met in different dimensions. Description is made below with examples.

Example 1

In this example, the permission setting object is the task information. That is, all task information may be the permission setting object. Thus, in the embodiment, the customization permission information for the task information may be displayed. For example, when the customization permission information is "Zhu San can view", "Zhu San can view" is displayed behind the task information correspondingly.

Or, customization permission information of each first information object of the task information may be displayed. For example, when the customization permission information is "Zhu San can view", "Zhu San can view" is displayed behind each first information object correspondingly.

Or, customization permission information of each second information object of the task information may be displayed. For example, when the customization permission information is "Zhu San can view", "Zhu San can view" is displayed behind each second information object correspondingly.

Or, the customization permission information of each first information object and each second information object of the task information may be displayed. For example, when the customization permission information is "Zhu San can view", "Zhu San can view" is displayed behind each first information object and each second information object correspondingly.

Example 2

In this example, the permission setting object is the first information object, i.e., a content of a next hierarchy of the task information. Displaying the customization permission information corresponding to the permission setting object means displaying the customization permission information of the first information object.

Figure 6A:
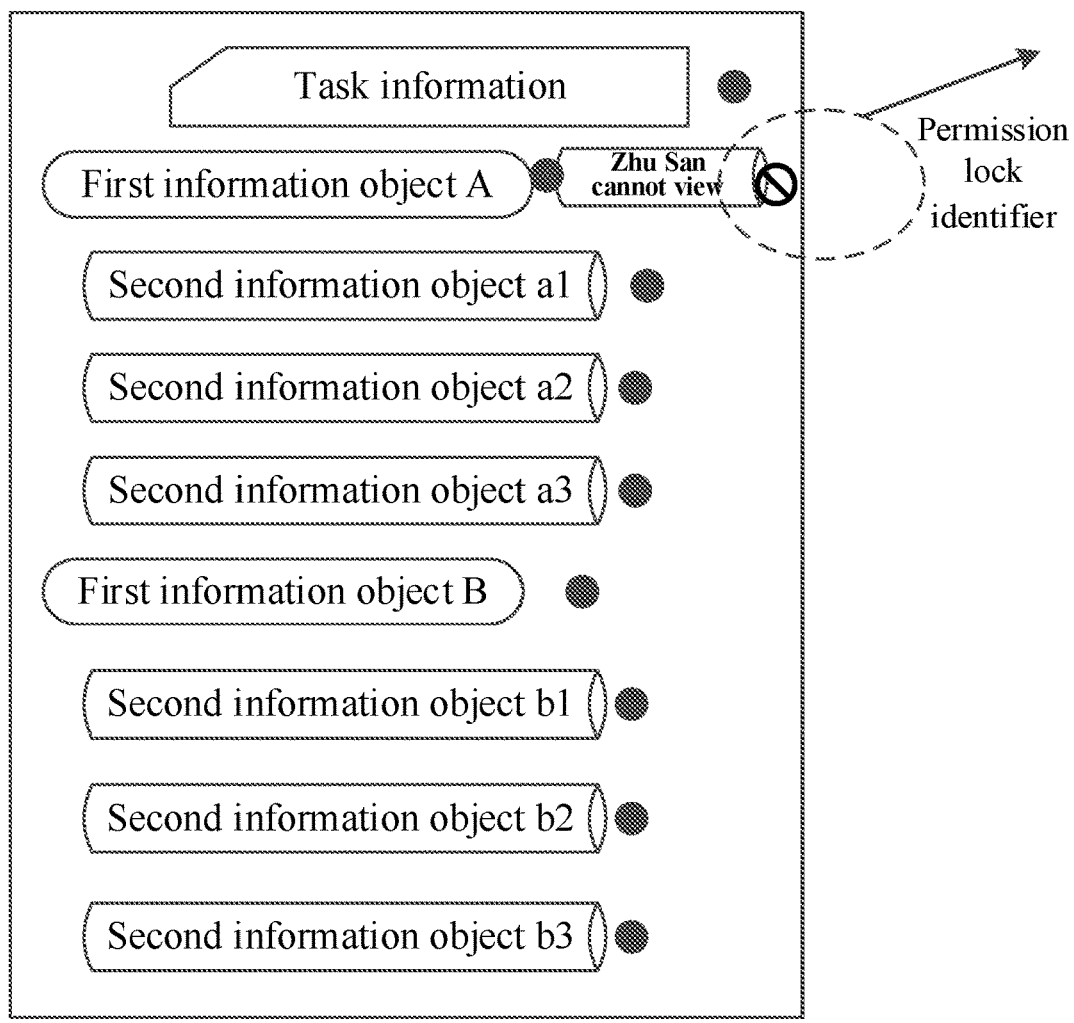
FIG. 6A is a schematic diagram showing an interface for still yet another permission setting according to an embodiment of the present disclosure.

For example, as illustrated in FIG. 6A, when the first information object is a "first information object A" and the customization permission information of the "first information object A" is "Zhu San cannot view", the corresponding customization permission information "Zhu San cannot view" is displayed behind the "first information object A".

As mentioned above, the first information object is the next hierarchy of the task information, thus a mismatch may occur between permission information of the first information object and permission information of the task information. For example, the permission information corresponding to the task information indicates visible only to superior users, but the permission information corresponding to the first target information object indicates visible to another user. To visualize the mismatch of permissions, in the embodiment, the permission information of the task information is obtained, in response to an editing operation on the customization permission information of the first information object, and whether the customization permission information displayed by the first information object matches permission information of the task information is determined. A permission lock identifier is displayed in an associated region of the first information object, in response to determining that the customization permission information of the first information object fails to match the permission information of the task information.

In different application scenarios, the associated region may be any region in which an associated information object is visually identified. For example, the associated region may be a blank region in a region where the first information object is located, or a blank region in a region where the first information object and all of the second information object included by the first information object are located, or the region where the first information object is located. The permission lock identifier may be one or more of a pattern, a color, a text, an animation, etc.

Figure 6B:
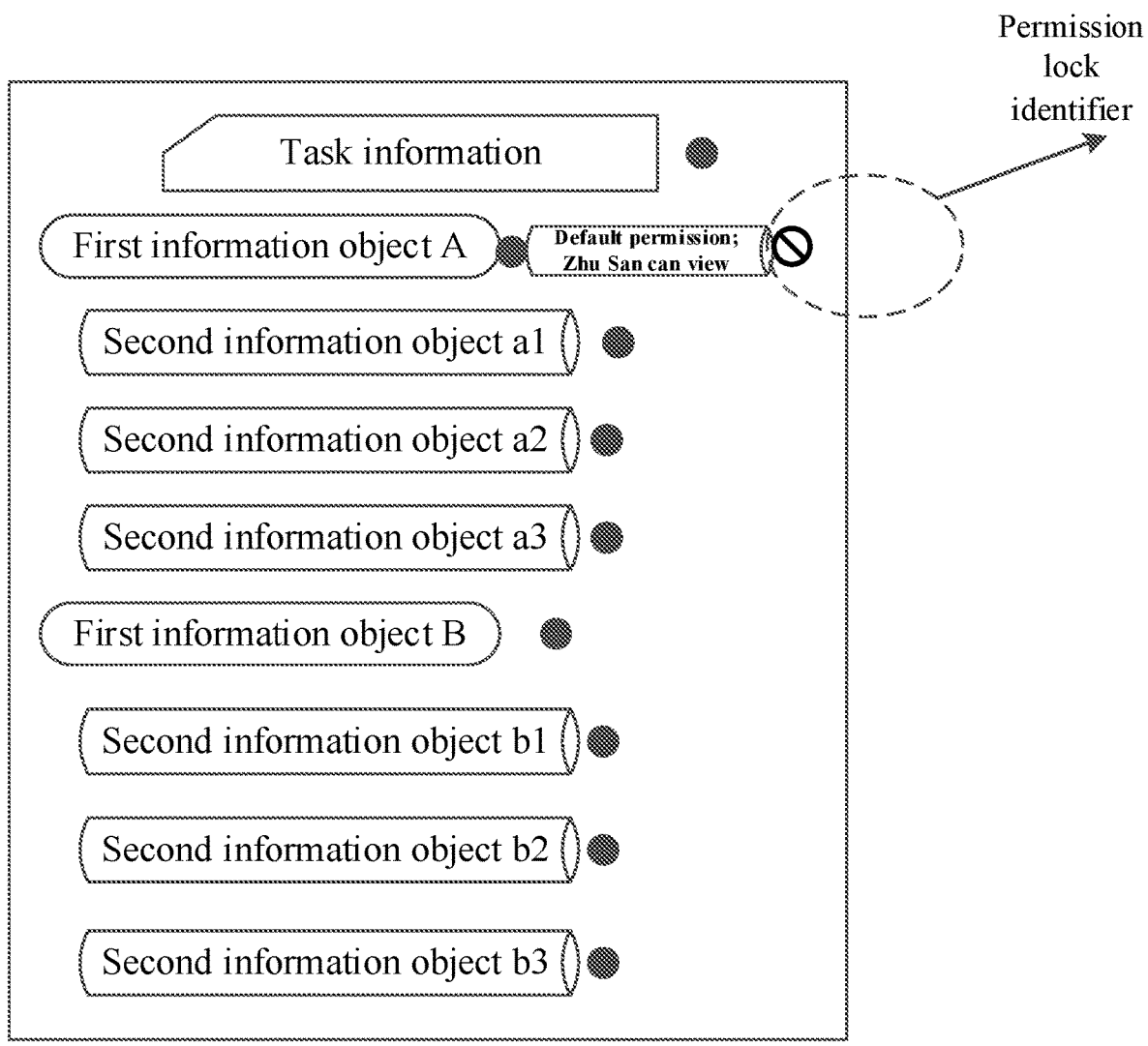
FIG. 6B is a schematic diagram showing an interface for still yet another permission setting according to an embodiment of the present disclosure.

For example, as illustrated in FIG. 6B, when the permission information of the task information is "visible only to superiors" and the user sets the customization permission information of the "first information object A" as "Zhu San can view" in a permission editing interface corresponding to a target, a mismatch of the permission information occurs since Zhu San does not belong to the superior users. To visualize the mismatch of permissions, a corresponding permission lock identifier is displayed in a blank region behind a region where the first information object A is located.

Example 3

In this example, the permission setting object is the second information object. That is, the permission setting object is an object at a next hierarchy of the first information object. Thus, the customization permission information of the second information object is displayed when the customization permission information corresponding to the permission setting object is displayed. Thus, it is convenient for a relevant person to intuitively obtain the customization permission information of the second information object.

For example, when the permission setting object is a second information object a1 and customization permission information of the second information object a1 is "Zhu San cannot view", the customization permission information "Zhu San cannot view" corresponding to the second information object a1 is displayed.

Of course, in this example, the mismatch of permissions also exists. For example, the permission information corresponding to the task information indicates visible only to the superior users, but the customization permission information corresponding to the second target object indicates visible to another user who does not belong to the superior users. To visualize the mismatch of permissions, in this embodiment, whether the customization permission information of the second information object matches permission information of the task information or permission information of the first information object is determined, in response to an editing operation on the customization permission information of the second information object. A permission lock identifier is displayed in an associated region of the second information object, in response to determining that the customization permission information of the second information object fails to match the permission information of the task information or the permission information of the first information object.

Figure 6C:
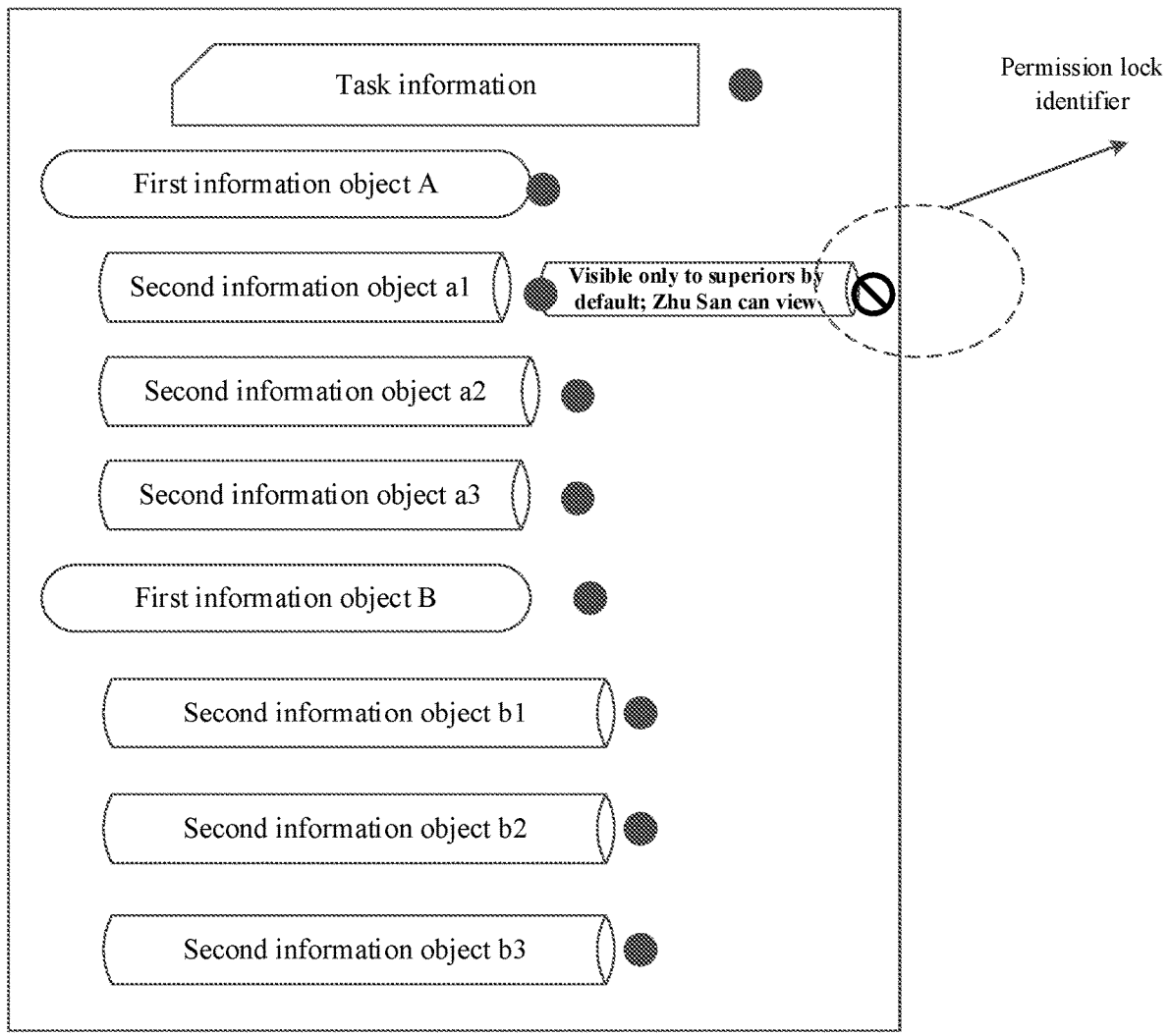
FIG. 6C is a schematic diagram showing an interface for still yet another permission setting according to an embodiment of the present disclosure.

For example, in different application scenarios, the associated region may be any region in which the associated information object is visually identified. For example, the associated region may be a blank region in a region where the second information object is located, and the permission lock identifier may be one or more of a pattern, a color, a text, an animation, etc. As an example, the permission information of the second information object fails to match the permission information of the task information. As illustrated in FIG. 6C, when the permission information of the task information is "visible only to superiors" and the customization permission information of the second information object a1 is set as "Zhu San can view", the corresponding permission lock identifier is displayed in the associated region behind the second information object a1 since Zhu San does not belong to the superior users.

In summary, with the permission setting method according to the embodiments of the present disclosure, the customization permission information is displayed in different ways in accordance with different permission setting objects, ensuring that the relevant person can intuitively obtain customization settings of permissions.

In practice, it is also possible that a system pre-sets an initial permission as a default permission. A content of the default permission may be "visible only to superior users", visible to some people, or visible to all people, etc. Usually, the default permission is general permission information set based on needs of scenarios. For example, in the task information, permission information of a lower hierarchy being the default permission means that the permission information of the lower hierarchy always changes with permission information of an upper hierarchy. Explanation is given below.

In some embodiments of the present disclosure, to prompt the relevant person that the customization permission information is inconsistent with the default permission, relevant display of a corresponding permission lock identifier is performed. The permission lock identifier in the embodiments may be one or more of a pattern, a color, a text, an animation, etc.

In the embodiment, a permission lock identifier is displayed in an associated region of the task information, in response to the customization permission information of the task information including no default permission. That is, the customization permission information of the task information includes permissions except the default permission. For example, the customization permission information of the task information includes "Zhu San can view" only and does not include the "default permission". And for another example, the customization permission information of the task information includes "Zhu San can view" and "available to the design department" only and does not include the "default permission", etc. The associated region of the task information may be a blank region in a region where the task information is located, or the region where the task information is located, etc.

In the embodiment, a permission lock identifier is displayed in an associated region of the first information object, in response to customization permission information of the first information object including no default permission. For example, further referring to FIG. 6A, the customization permission information of the first information object A only includes "Zhu San cannot view" and does not include the "default permission". The associated region of the first information object may be the blank region in the region where the task information is located, or the region where the first information object is located, etc.

In the embodiment, a permission lock identifier is displayed in an associated region of the second information object, in response to customization permission information of the second information object including no default permission. The associated region of the second information object may be the blank region in the region where the task information is located, or the region where the second information object is located, etc.

In some embodiments of the present disclosure, when both the first information object and the second information object are default permissions, the permissions of the first information object and the second information object may be adjusted along with an adjustment of the default permission for the sake of a permission setting efficiency.

In this example, whether customization permission information of each of the first information object and the second information object that correspond to the task information is a default permission is determined, in response to an editing operation on customization permission information of the task information. The customization permission information of each of the first information object and the second information object is adjusted to be identical to the customization permission information of the task information, in response to determining that the customization permission information of each of the first information object and the second information object that correspond to the task information is the default permission.

Of course, the customization permission information of each of the first information object and the second information object is kept unchanged, in response to determining that the customization permission information of each of the first information object and the second information object that correspond to the task information is not the default permission. The permission information of each of the first information object and the second information object does not change with the default permission.

In some embodiments of the present disclosure, when the permission information of the first information object is adjusted, a permission of the second information object changes accordingly when the corresponding second information object is the default permission, and the permission of the second information object does not change accordingly when the corresponding second information object is not the default permission.

In this example, whether customization permission information of the second information object is a default permission is determined, in response to an editing operation on customization permission information of the first information object. The customization permission information of the second information object is adjusted to be identical to the customization permission information of the first information object, in response to determining that the customization permission information of the second information object is the default permission. The customization permission information of the second information object is kept unchanged, in response to determining that the customization permission information of the second information object is not the default permission.

In summary, with the permission setting method according to the embodiments of the present disclosure, for the default permission, a permission of a relevant information object is modified accordingly, thereby improving the permission management efficiency.

To improve the permission management efficiency during editing of customization information of the task information, in the embodiments of the present disclosure, permission information of a relevant permission object can be controlled, when the relevant permission object maintains a state of initial permission information, to be modified with a modification of permission information of an upper hierarchy. Description is made below with specific scenarios.

In some embodiments of the present disclosure, when the customization permission information of the task information is edited, whether the permission information of each of the first information object and the second information object of the lower hierarchy is maintained in a state of default initial permission information is determined. In response to determining that the permission information of each of the first information object and the second information object of the lower hierarchy is maintained in the state of the default initial permission information, the information objects of the lower hierarchy are controlled to be modified with a modification of a permission of the task information to improve the permission setting efficiency. In response to determining that the permission information of each of the first information object and the second information object of the lower hierarchy fails to be maintained in the state of the default initial permission information, the information objects of the lower hierarchy are controlled not to be modified with the modification of the permission of task information to meet a need of personalized permission setting.

In the embodiment, whether customization permission information of each of the first information object and the second information object that correspond to the task information is unmodified is determined, in response to an editing operation on customization permission information of the task information. That is, whether the customization permission information has ever been modified is determined, regardless of whether the customization permission information is modified to the default initial permission information. The customization permission information is determined not to belong to a default initial permission state, as long as the customization permission information is modified.

The customization permission information of each of the first information object and the second information object is adjusted to be identical to the customization permission information of the task information, in response to determining that the customization permission information of each of the first information object and the second information object that correspond to the task information is unmodified.

The customization permission information of each of the first information object and the second information object is kept unchanged, in response to determining that the customization permission information of each of the first information object and the second information object that correspond to the task information is modified.

In some embodiments of the present disclosure, when the customization permission information of the first information object is edited, whether the permission information of the second information object of the lower hierarchy is maintained in the state of the default initial permission information is determined. In response to determining that the permission information of the second information object of the lower hierarchy is maintained in the state of the default initial permission information, the information object of the lower hierarchy is controlled to be modified with the modification of the permission of the task information to improve the permission setting efficiency. In response to determining that the permission information of the second information object of the lower hierarchy fails to be maintained in the state of the default initial permission information, the information object of the lower hierarchy is controlled not to be modified with the modification of the permission of task information to meet the need of personalized permission setting.

In this example, whether customization permission information of the second information object is unmodified is determined, in response to an editing operation on customization permission information of the first information object. The customization permission information of the second information object is adjusted to be identical to the customization permission information of the first information object, in response to determining that the customization permission information of the second information object is unmodified. The customization permission information of the second information object is kept unchanged, in response to determining that the customization permission information of the second information object is modified.

In summary, with the permission setting method according to the embodiments of the present disclosure, the permission information of the relevant permission object is controlled, when the relevant permission object maintains the state of the default initial permission information, to be modified with to the modification of the permission information of the upper hierarchy, and the relevant permission object is controlled, when the relevant permission object fails to maintain the state of the default initial permission information, to maintain the customization permission information, thereby balancing the permission setting efficiency and the need of personalized permission setting.

Based on the above embodiments, a permission may be customized based on a permission group, etc. Thus, a permission can be customized for a plurality of users at one time, greatly improving the permission setting efficiency.

Figure 7:
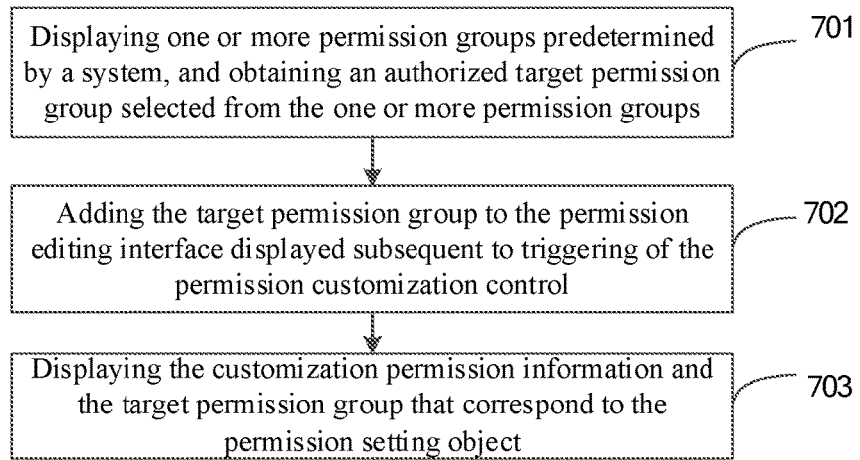
FIG. 7 is yet another schematic flowchart illustrating a permission setting method according to an embodiment of the present disclosure.

In an embodiment of the present disclosure, as illustrated in FIG. 7, the method further includes operations at blocks, subsequent to the in response to the trigger operation on the permission setting object of the task information.

At block 701, one or more permission groups predetermined by a system are displayed, and an authorized target permission group selected from the one or more permission groups is obtained.

Each permission group includes at least one user. A type of the permission group varies from scenario to scenario. In some embodiments, the type of the permission group may be any permission group type recognized based on a scenario. For example, in some scenarios, the type of the permission group may include types such as a mail group, a management group, and a process group.

At block 702, the target permission group is added to the permission editing interface displayed subsequent to triggering of the permission customization control.

In the embodiment, the target permission group is added to the permission editing interface displayed subsequent to the triggering of the permission customization control, in such a manner that permission editing of the target permission group can be realized with one click.

At block 703, the customization permission information and the target permission group that correspond to the permission setting object are displayed.

In the embodiment, the customization permission information and the target permission group that correspond to the permission setting object are displayed, which intuitively displays that all users in the target permission group are authorized with customization-relevant permission information of the permission setting object.

Of course, in the embodiment, to flexibly meet the permission setting need, a new permission group may be created. That is, in an embodiment of the present disclosure, a permission group editing interface is displayed, in response to a trigger operation performed by the user to create a new permission group. A group name and permission information of group members that are inputted by the user via the permission group editing interface are obtained. Further, a permission group corresponding to the group name is established, based on the permission information of the group members.

For example, the permission group editing interface is displayed, in response to the trigger operation performed by the user to create the new permission group. The group name and the permission information of the group members that are inputted by the user via the permission group editing interface are received. The permission information may be any permission information, e.g., visible to a predetermined user, visible to a superior user, etc.

Further, in an embodiment of the present disclosure, late-stage editing of a permission group cyclic permission for the permission group may be further performed. In the embodiment, a cyclic permission identifier corresponding to the permission group is displayed, in response to a trigger operation on a cyclic permission control for the permission group. The cyclic permission control for the permission group is used to limit that relevant permission information of the permission group for each new cycle is automatically activated. The cyclic permission identifier is used to limit whether to automatically activate permission information of a corresponding permission group. Further, task information within a subsequent cycle is authorized for the permission group based on the cyclic permission identifier. Thus, a need to set permission information in each subsequent cycle is eliminated, which increases the permission setting efficiency for the permission group.

For example, in response to a trigger operation performed by the user on a cyclic permission control for the design department, a corresponding cyclic permission identifier is displayed behind permission information for the design department. Task information in a subsequent cycle is directly authorized based on the permission information for the design department, thus no separate settings are required.

In some possible embodiments, to improve flexibility of permission setting, a close function for the permission setting interface is further provided. When the user clicks on a close control of the permission setting interface, a pop-up message relevant to permission saving is displayed. The user can save changed permission information and close the permission setting interface by clicking on a "Save" control in the pop-up message, or abandon saving the changed permission information and close the permission setting interface by clicking on a "Not Save" control, or keep displaying a current permission setting interface by clicking on a "Cancel" control.

In summary, with the permission setting method according to the embodiments of the present disclosure, permission information of the plurality of users can be set at one time by using the permission group as a setting unit. Managing permissions based on the permission group can further facilitate an increase in the permission setting efficiency.

To implement the above embodiments, the present disclosure further provides a permission setting apparatus.

Figure 8:
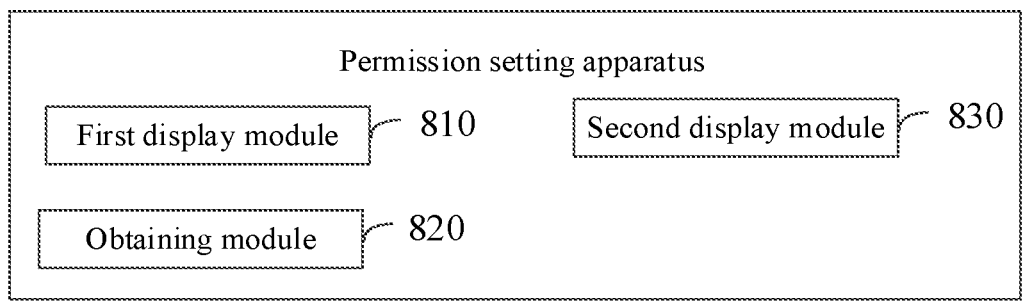
FIG. 8 is a schematic diagram showing a structure of a permission setting apparatus according to an embodiment of the present disclosure.

FIG. 8 is a schematic diagram showing a structure of a permission setting apparatus according to an embodiment of the present disclosure. As illustrated in FIG. 8, the permission setting apparatus includes a first display module 810, an obtaining module 820, and a second display module 830.

The first display module 810 is configured to display a permission customization control, in response to a trigger operation performed by a user on a permission setting object of task information. The permission setting object includes a first information object and/or a second information object. The second information object is subordinate to the first information object.

The obtaining module 820 is configured to display a permission editing interface, in response to a trigger operation on the permission customization control, and receive customization permission information via the permission editing interface.

The second display module 830 is configured to display the customization permission information corresponding to the permission setting object.

In an embodiment of the present disclosure, the obtaining module 820 is specifically configured to: receive an organizational attribute and search information that are inputted in the permission editing interface; query a predetermined database corresponding to the organizational attribute, to obtain one or more candidate results successfully matched by the search information, and display the one or more candidate results; and obtain a target result selected from the one or more candidate results and set permission information corresponding to the target result.

The permission setting apparatus provided by the embodiments of the present disclosure can execute the permission setting method provided by any embodiment of the present disclosure, includes corresponding functional modules configured to perform the method, and has advantageous effects.

In summary, with the permission setting apparatus according to the embodiments of the present disclosure, the permission customization control is displayed, in response to the trigger operation performed by the user on the permission setting object of the task information. The permission editing interface is displayed, in response to the trigger operation on the permission customization control. The customization permission information is received via the permission editing interface. The customization permission information corresponding to the permission setting object is displayed. Therefore, the hierarchical structure based on the task information satisfies the setting need for the content-based permission customization, and improves the permission management efficiency.

In an embodiment of the present disclosure, the second display module 830 is specifically configured to, when the permission setting object is the task information: display customization permission information of the task information; or display customization permission information of each first information object of the task information; and/or display customization permission information of each second information object of the task information.

In an embodiment of the present disclosure, the second display module 830 is specifically configured to, when the permission setting object is the first information object: display customization permission information of the first information object.

In an embodiment of the present disclosure, the permission setting apparatus further includes a first determining module 840 and a third display module 850.

The first determining module 840 is configured to determine whether the customization permission information of the first information object matches permission information of the task information, in response to an editing operation on the customization permission information of the first information object.

The third display module 850 is configured to display a permission lock identifier in an associated region of the first information object, in response to determining that the customization permission information of the first information object fails to match the permission information of the task information.

In an embodiment of the present disclosure, the second display module 830 is specifically configured to, when the permission setting object is the second information object: display customization permission information of the second information object.

In an embodiment of the present disclosure, the permission setting apparatus further includes a second determining module 860 and a fourth display module 870.

The second determining module 860 is configured to determine whether the customization permission information of the second information object matches permission information of the task information or permission information of the first information object, in response to an editing operation on the customization permission information of the second information object.

The fourth display module 870 is configured to display a permission lock identifier in an associated region of the second information object, in response to determining that the customization permission information of the second information object fails to match the permission information of the task information or the permission information of the first information object.

The permission setting apparatus provided by the embodiments of the present disclosure can execute the permission setting method provided by any embodiment of the present disclosure, includes corresponding functional modules configured to perform the method, and has advantageous effects.

In summary, with the permission setting apparatus according to the embodiments of the present disclosure, the customization permission information is displayed in different ways in accordance with different permission setting objects, ensuring that the relevant person can intuitively obtain the customization settings of permissions.

In an embodiment of the present disclosure, the permission setting apparatus is further configured to: display a permission lock identifier in an associated region of the task information, in response to customization permission information of the task information including no default permission; or display a permission lock identifier in an associated region of the first information object, in response to customization permission information of the first information object including no default permission; or display a permission lock identifier in an associated region of the second information object, in response to customization permission information of the second information object including no default permission.

In an embodiment of the present disclosure, the permission setting apparatus is further configured to: determine whether customization permission information of each of the first information object and the second information object that correspond to the task information is a default permission, in response to an editing operation on customization permission information of the task information; adjust the customization permission information of each of the first information object and the second information object to be identical to the customization permission information of the task information, in response to determining that the customization permission information of each of the first information object and the second information object that correspond to the task information is the default permission; and keep the customization permission information of each of the first information object and the second information object unchanged, in response to determining that the customization permission information of each of the first information object and the second information object that correspond to the task information is not the default permission.

In an embodiment of the present disclosure, the permission setting apparatus is further configured to: determine whether customization permission information of the second information object is a default permission, in response to an editing operation on customization permission information of the first information object; adjust the customization permission information of the second information object to be identical to the customization permission information of the first information object, in response to determining that the customization permission information of the second information object is the default permission; and keep the customization permission information of the second information object unchanged, in response to determining that the customization permission information of the second information object is not the default permission.

In an embodiment of the present disclosure, the permission setting apparatus is further configured to: determine whether customization permission information of each of the first information object and the second information object that correspond to the task information is unmodified, in response to an editing operation on customization permission information of the task information; adjust the customization permission information of each of the first information object and the second information object to be identical to the customization permission information of the task information, in response to determining that the customization permission information of each of the first information object and the second information object that correspond to the task information is unmodified; and keep the customization permission information of each of the first information object and the second information object unchanged, in response to determining that the customization permission information of each of the first information object and the second information object that correspond to the task information is modified.

In an embodiment of the present disclosure, the permission setting apparatus is further configured to: determine whether customization permission information of the second information object is unmodified, in response to an editing operation on customization permission information of the first information object; adjust the customization permission information of the second information object to be identical to the customization permission information of the first information object, in response to determining that the customization permission information of the second information object is unmodified; and keep the customization permission information of the second information object unchanged, in response to determining that the customization permission information of the second information object is modified.

The permission setting apparatus provided by the embodiments of the present disclosure can execute the permission setting method provided by any embodiment of the present disclosure, includes corresponding functional modules configured to perform the method, and has advantageous effects.

In an embodiment of the present disclosure, the permission setting apparatus is further configured to: display one or more permission groups predetermined by a system, and obtain an authorized target permission group selected from the one or more permission groups; and add the target permission group to the permission editing interface displayed subsequent to triggering of the permission customization control. The displaying the customization permission information corresponding to the permission setting object includes: displaying the customization permission information and the target permission group that correspond to the permission setting object.

In an embodiment of the present disclosure, the permission setting apparatus is further configured to: display a permission group editing interface, in response to a trigger operation to create a new permission group; receive a group name and permission information of group members that are inputted via the permission group editing interface; and establish a permission group corresponding to the group name, based on the permission information of the group members.

In an embodiment of the present disclosure, the permission setting apparatus is further configured to: display a cyclic permission identifier in an associated region of the permission group, in response to a trigger operation on a cyclic permission control for the permission group; and authorize task information within a subsequent cycle for the permission group, based on the cyclic permission identifier.

The permission setting apparatus provided by the embodiments of the present disclosure can execute the permission setting method provided by any embodiment of the present disclosure, includes corresponding functional modules configured to perform the method, and has advantageous effects.

In summary, with the permission setting apparatus according to the embodiments of the present disclosure, the permission information of the plurality of users can be set at one time by using the permission group as the setting unit. Managing permissions based on the permission group can further facilitate an increase in the permission setting efficiency.

To implement the above embodiments, the present disclosure further provides a computer program product including a computer program/instruction. The computer program/instruction, when executed by a processor, implement the above embodiments of the permission setting method.

Figure 9:
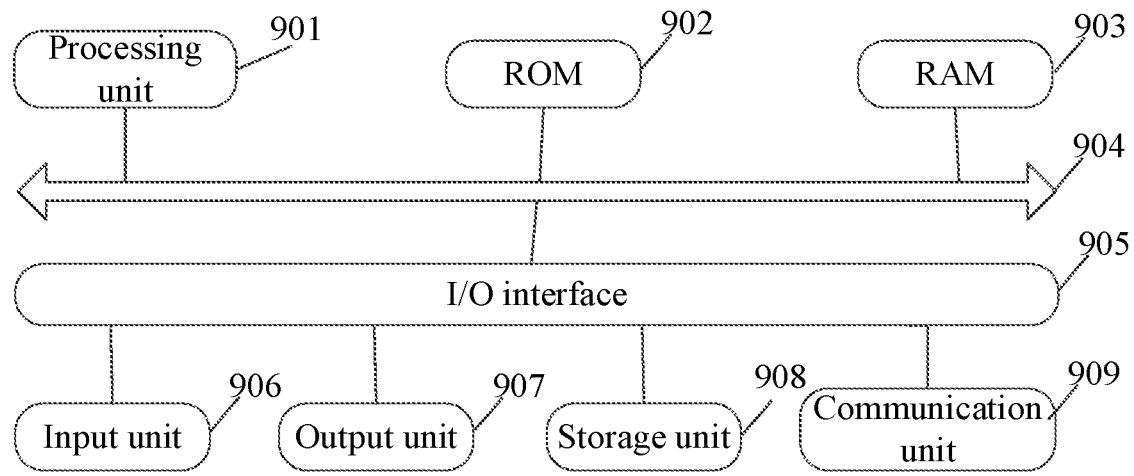
FIG. 9 is a schematic diagram showing a structure of an electronic device according to an embodiment of the present disclosure.

FIG. 9 is a schematic diagram showing a structure of an electronic device according to an embodiment of the present disclosure.

Reference is now made to FIG. 9, which is a schematic diagram showing a structure of an electronic device 900 adapted to implement the embodiments of the present disclosure. The electronic device 900 of the embodiments of the present disclosure may include, but are not limited to, mobile terminals such as a mobile phone, a laptop computer, a digital broadcast receiver, a Personal Digital Assistant (PDA), a tablet computer or PAD, a Portable Multimedia Player (PMP), an on-vehicle terminal (e.g., an on-vehicle navigation terminal), etc., and fixed terminals such as a digital TV, a desktop computer, etc. The electronic device illustrated in FIG. 9 is exemplary only, and should not be construed as limiting the function and scope of use of the embodiments of the present disclosure.

As illustrated in FIG. 9, the electronic device 900 may include a processing unit (such as a central processor, a graphics processor, etc.) 901, which may perform various appropriate actions and processes in accordance with programs stored in a Read Only Memory (ROM) 902 or loaded from a storage unit 908 into a Random Access Memory (RAM) 903. In the RAM 903, various programs and data required for operation of the electronic device 900 may also be stored. The processing unit 901, the ROM 902, and the RAM 903 are connected to each other through a bus 904. An Input/Output (I/O) interface 905 is also connected to the bus 904.

Generally, the following units may be connected to the I/O interface 905: an input unit 906 including, for example, a touch screen, a touch pad, a keyboard, a mouse, a camera, a microphone, an accelerometer, a gyroscope, etc.; an output unit 907 including, for example, a Liquid Crystal Display (LCD), a speaker, an oscillator, etc.; the storage unit 908 including, for example, a magnetic tape or a hard disk; and a communication unit 909. The communication unit 909 may allow the electronic device 900 to perform wireless or wired communication with other devices for data exchange. Although FIG. 9 illustrates the electronic device 900 having various units, it can be appreciated that it is not necessary to implement or provide all the illustrated units. Alternatively, more or fewer units may be implemented or provided.

In particular, according to embodiments of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 909, or installed from the storage unit 908, or installed from the ROM 902. When the computer program is executed by the processing unit 901, the above-mentioned functions defined in the permission setting method according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer disk, a hard disk, an RAM, an ROM, an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server can communicate using any currently-known or future-developed network protocol, such as Hypertext Transfer Protocol (HTTP), and can be in interconnection communication with digital data in any form or medium (e.g., a communication network). Examples of communication networks include a Local Area Network (LAN), a Wide Area Network (WAN), the Internet work (e.g., the Internet), and an end-to-end network (e.g., ad hoc end-to-end network), as well as any currently-known or future-developed network.

The above computer-readable medium may be included in the above electronic device; or may be present independently without being assembled into the electronic device.

The above computer-readable medium may carry one or more programs which, when executed by the electronic device, cause the electronic device to: display a permission customization control, in response to a trigger operation performed by a user on a permission setting object of task information; display a permission editing interface, in response to a trigger operation on the permission customization control, and receive customization permission information via the permission editing interface; and display the customization permission information corresponding to the permission setting object. Therefore, a hierarchical structure based on the task information satisfies a setting need for content-based permission customization, and improves the permission management efficiency.

The computer program codes for implementing the operations according to the present disclosure may be written in one or more programming languages or any combination thereof. The programming languages may include but are not limited to object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on a remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure can be implemented in software or hardware. Here, a name of a unit does not constitute a limitation on the module or the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

According to one or more embodiments of the present disclosure, the present disclosure provides a permission setting method. The method includes: displaying a permission customization control, in response to a trigger operation performed by a user on a permission setting object of task information, the permission setting object including a first information object and/or a second information object, the second information object being subordinate to the first information object; displaying a permission editing interface, in response to that the user triggers a trigger operation on the permission customization control, and receiving and obtaining customization permission information inputted by the user via the permission editing interface; and displaying the customization permission information corresponding to the permission setting object.

According to one or more embodiments of the present disclosure, receiving the customization permission information via the permission editing interface includes: receiving an organizational attribute and search information that are inputted in the permission editing interface; querying a predetermined database corresponding to the organizational attribute, to obtain one or more candidate results successfully matched by the search information, and displaying the one or more candidate results; and obtaining a target result selected from the one or more candidate results and setting permission information corresponding to the target result.

According to one or more embodiments of the present disclosure, when the permission setting object is the task information, displaying the customization permission information corresponding to the permission setting object includes: displaying customization permission information of the task information; or displaying customization permission information of each first information object of the task information; and/or displaying customization permission information of each second information object of the task information.

According to one or more embodiments of the present disclosure, when the permission setting object is the first information object, displaying the customization permission information corresponding to the permission setting object includes: displaying customization permission information of the first information object.

According to one or more embodiments of the present disclosure, the method further includes: determining whether the customization permission information of the first information object matches permission information of the task information, in response to an editing operation on the customization permission information of the first information object; and displaying a permission lock identifier in an associated region of the first information object, in response to determining that the customization permission information of the first information object fails to match the permission information of the task information.

According to one or more embodiments of the present disclosure, when the permission setting object is the second information object, displaying the customization permission information corresponding to the permission setting object includes: displaying customization permission information of the second information object.

According to one or more embodiments of the present disclosure, the method further includes: determining whether the customization permission information of the second information object matches permission information of the task information or permission information of the first information object, in response to an editing operation on the customization permission information of the second information object; and displaying a permission lock identifier in an associated region of the second information object, in response to determining that the customization permission information of the second information object fails to match the permission information of the task information or the permission information of the first information object.

According to one or more embodiments of the present disclosure, the method further includes: displaying a permission lock identifier in an associated region of the task information, in response to customization permission information of the task information including no default permission; or displaying a permission lock identifier in an associated region of the first information object, in response to customization permission information of the first information object including no default permission; or displaying a permission lock identifier in an associated region of the second information object, in response to customization permission information of the second information object including no default permission.

According to one or more embodiments of the present disclosure, the method further includes: determining whether customization permission information of each of the first information object and the second information object that correspond to the task information is a default permission, in response to an editing operation on customization permission information of the task information; adjusting the customization permission information of each of the first information object and the second information object to be identical to the customization permission information of the task information, in response to determining that the customization permission information of each of the first information object and the second information object that correspond to the task information is the default permission; and keeping the customization permission information of each of the first information object and the second information object unchanged, in response to determining that the customization permission information of each of the first information object and the second information object that correspond to the task information is not the default permission.

According to one or more embodiments of the present disclosure, the method further includes: determining whether customization permission information of the second information object is a default permission, in response to an editing operation on customization permission information of the first information object; adjusting the customization permission information of the second information object to be identical to the customization permission information of the first information object, in response to determining that the customization permission information of the second information object is the default permission; and keeping the customization permission information of the second information object unchanged, in response to determining that the customization permission information of the second information object is not the default permission.

According to one or more embodiments of the present disclosure, the method further includes: determining whether customization permission information of each of the first information object and the second information object that correspond to the task information is unmodified, in response to an editing operation on customization permission information of the task information; adjusting the customization permission information of each of the first information object and the second information object to be identical to the customization permission information of the task information, in response to determining that the customization permission information of each of the first information object and the second information object that correspond to the task information is unmodified; and keeping the customization permission information of each of the first information object and the second information object unchanged, in response to determining that the customization permission information of each of the first information object and the second information object that correspond to the task information is modified.

According to one or more embodiments of the present disclosure, the method further includes: determining whether customization permission information of the second information object is unmodified, in response to an editing operation on customization permission information of the first information object; adjusting the customization permission information of the second information object to be identical to the customization permission information of the first information object, in response to determining that the customization permission information of the second information object is unmodified; and keeping the customization permission information of the second information object unchanged, in response to determining that the customization permission information of the second information object is modified.

According to one or more embodiments of the present disclosure, the method further includes: performing an authorization for the task information within a current cycle, based on the customization permission information.

According to one or more embodiments of the present disclosure, the method further includes, subsequent to the in response to the trigger operation on the permission setting object of the task information: displaying one or more permission groups predetermined by a system, and obtaining an authorized target permission group selected from the one or more permission groups; and adding the target permission group to the permission editing interface displayed subsequent to triggering of the permission customization control. Displaying the customization permission information corresponding to the permission setting object includes: displaying the customization permission information and the target permission group that correspond to the permission setting object.

According to one or more embodiments of the present disclosure, the method further includes: displaying a permission group editing interface, in response to a trigger operation to create a new permission group; receiving a group name and permission information of group members that are inputted via the permission group editing interface; and establishing a permission group corresponding to the group name, based on the permission information of the group members.

According to one or more embodiments of the present disclosure, the method further includes: displaying a cyclic permission identifier in an associated region of the permission group, in response to a trigger operation on a cyclic permission control for the permission group; and authorizing task information within a subsequent cycle for the permission group, based on the cyclic permission identifier.

According to one or more embodiments of the present disclosure, the present disclosure provides a permission setting apparatus. The apparatus includes a first display module, an obtaining module, and a second display module.

The first display module is configured to display a permission customization control, in response to a trigger operation performed by a user on a permission setting object of task information. The permission setting object includes a first information object and/or a second information object. The second information object is subordinate to the first information object.

The obtaining module is configured to display a permission editing interface, in response to a trigger operation on the permission customization control, and receive customization permission information via the permission editing interface.

The second display module is configured to display the customization permission information corresponding to the permission setting object.

According to one or more embodiments of the present disclosure, the obtaining module is specifically configured to: receive an organizational attribute and search information that are inputted in the permission editing interface; query a predetermined database corresponding to the organizational attribute, to obtain one or more candidate results successfully matched by the search information, and display the one or more candidate results; and obtain a target result selected from the one or more candidate results and set permission information corresponding to the target result.

According to one or more embodiments of the present disclosure, the second display module is specifically configured to, when the permission setting object is the task information: display customization permission information of the task information; or display customization permission information of each first information object of the task information; and/or display customization permission information of each second information object of the task information.

According to one or more embodiments of the present disclosure, the second display module is specifically configured to, when the permission setting object is the first information object: display customization permission information of the first information object.

According to one or more embodiments of the present disclosure, the apparatus further includes a first determining module and a third display module.

The first determining module is configured to determine whether the customization permission information of the first information object matches permission information of the task information, in response to an editing operation on the customization permission information of the first information object.

The third display module is configured to display a permission lock identifier in an associated region of the first information object, in response to determining that the customization permission information of the first information object fails to match the permission information of the task information.

According to one or more embodiments of the present disclosure, the second display module is specifically configured to, when the permission setting object is the second information object: display customization permission information of the second information object.

According to one or more embodiments of the present disclosure, the apparatus further includes a second determining module and a fourth display module.

The second determining module is configured to determine whether the customization permission information of the second information object matches permission information of the task information or permission information of the first information object, in response to an editing operation on the customization permission information of the second information object.

The fourth display module is configured to display a permission lock identifier in an associated region of the second information object, in response to determining that the customization permission information of the second information object fails to match the permission information of the task information or the permission information of the first information object.

According to one or more embodiments of the present disclosure, the apparatus further includes a fifth display module.

The fifth display module is configured to: display a permission lock identifier in an associated region of the task information, in response to customization permission information of the task information including no default permission; or display a permission lock identifier in an associated region of the first information object, in response to customization permission information of the first information object including no default permission; or display a permission lock identifier in an associated region of the second information object, in response to customization permission information of the second information object including no default permission.

According to one or more embodiments of the present disclosure, the apparatus further includes a third determining module and a first permission setting module.

The third determining module is configured to determine whether customization permission information of each of the first information object and the second information object that correspond to the task information is a default permission, in response to an editing operation on customization permission information of the task information.

The first permission setting module is configured to adjust the customization permission information of each of the first information object and the second information object to be identical to the customization permission information of the task information, in response to determining that the customization permission information of each of the first information object and the second information object that correspond to the task information is the default permission.

The first permission setting module is further configured to keep the customization permission information of each of the first information object and the second information object unchanged, in response to determining that the customization permission information of each of the first information object and the second information object that correspond to the task information is not the default permission.

According to one or more embodiments of the present disclosure, the apparatus further includes a fourth determining module and a second permission setting module.

The fourth determining module is configured to determine whether customization permission information of the second information object is a default permission, in response to an editing operation on customization permission information of the first information object.

The second permission setting module is configured to adjust the customization permission information of the second information object to be identical to the customization permission information of the first information object, in response to determining that the customization permission information of the second information object is the default permission.

The second permission setting module is further configured to keep the customization permission information of the second information object unchanged, in response to determining that the customization permission information of the second information object is not the default permission.

According to one or more embodiments of the present disclosure, the apparatus further includes a fifth determining module and a third permission setting module.

The fifth determining module is configured to determine whether customization permission information of each of the first information object and the second information object that correspond to the task information is unmodified, in response to an editing operation on customization permission information of the task information.

The third permission setting module is configured to adjust the customization permission information of each of the first information object and the second information object to be identical to the customization permission information of the task information, in response to determining that the customization permission information of each of the first information object and the second information object that correspond to the task information is unmodified.

The third permission setting module is further configured to keep the customization permission information of each of the first information object and the second information object unchanged, in response to determining that the customization permission information of each of the first information object and the second information object that correspond to the task information is modified.

According to one or more embodiments of the present disclosure, the apparatus further includes a sixth determining module and a fourth permission setting module.

The sixth determining module is configured to determine whether customization permission information of the second information object is unmodified, in response to an editing operation on customization permission information of the first information object.

The fourth permission setting module is configured to adjust the customization permission information of the second information object to be identical to the customization permission information of the first information object, in response to determining that the customization permission information of the second information object is unmodified.

The fourth permission setting module is further configured to keep the customization permission information of the second information object unchanged, in response to determining that the customization permission information of the second information object is modified.

According to one or more embodiments of the present disclosure, the apparatus further includes a first permission authorization module.

The first permission authorization module is configured to perform an authorization for the task information within a current cycle, based on the customization permission information.

According to one or more embodiments of the present disclosure, the apparatus further includes a sixth display module and an addition module.

The sixth display module is configured to display one or more permission groups predetermined by a system, and obtain an authorized target permission group selected from the one or more permission groups.

The addition module is configured to add the target permission group to the permission editing interface displayed subsequent to triggering of the permission customization control.

The second display module is configured to display the customization permission information and the target permission group that correspond to the permission setting object.

According to one or more embodiments of the present disclosure, the apparatus further includes a seventh display module and a permission group processing module.

The seventh display module is configured to display a permission group editing interface, in response to a trigger operation to create a new permission group.

The permission group processing module is configured to receive a group name and permission information of group members that are inputted via the permission group editing interface, and establish a permission group corresponding to the group name based on the permission information of the group members.

According to one or more embodiments of the present disclosure, the apparatus further includes an eighth display module and a second permission authorization module.

The eighth display module is configured to display a cyclic permission identifier in an associated region of the permission group, in response to a trigger operation on a cyclic permission control for the permission group.

The second permission authorization module is configured to authorize task information within a subsequent cycle for the permission group, based on the cyclic permission identifier.

According to one or more embodiments of the present disclosure, the present disclosure provides an electronic device. The electronic device includes a processor and a memory configured to store executable instructions of the processor. The processor is configured to read the executable instructions from the memory, and execute the executable instructions to implement the permission setting method according to any of the embodiments of the present disclosure.

According to one or more embodiments of the present disclosure, the present disclosure provides a computer-readable storage medium. The computer-readable storage medium stores a computer program. The computer program is configured to perform the permission setting method according to any of the embodiments of the present disclosure.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, but should also encompass other technical solutions formed by any other combinations of features described above or equivalents thereof without departing from the above ideas of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:

1. A permission setting method, comprising:
   displaying a permission customization control, in response to a trigger operation on a permission setting object, the permission setting object comprising task information and at least one of a first information object and a second information object, the task information, the first information object and the second information being work information having a hierarchical structure, the second information object being subordinate to the first information object, and the first information object and the second information object being subordinate to the task information;
   displaying a permission editing interface, in response to a trigger operation on the permission customization control, and receiving customization permission information via the permission editing interface; and
   displaying the customization permission information corresponding to the permission setting object.

2. The method according to claim 1, wherein said receiving the customization permission information via the permission editing interface comprises:
   receiving an organizational attribute and search information that are inputted in the permission editing interface;
   querying a predetermined database corresponding to the organizational attribute, to obtain one or more candidate results successfully matched by the search information, and displaying the one or more candidate results; and
   obtaining a target result selected from the one or more candidate results and setting permission information corresponding to the target result.

3. The method according to claim 1, wherein when the permission setting object is the task information, said displaying the customization permission information corresponding to the permission setting object comprises:
- displaying customization permission information of the task information; or
- displaying customization permission information of each first information object of the task information; and/or
- displaying customization permission information of each second information object of the task information.

4. The method according to claim 1, wherein when the permission setting object is the first information object, said displaying the customization permission information corresponding to the permission setting object comprises:
- displaying customization permission information of the first information object.

5. The method according to claim 4, further comprising:
- determining whether the customization permission information of the first information object matches permission information of the task information, in response to an editing operation on the customization permission information of the first information object; and
- displaying a permission lock identifier in an associated region of the first information object, in response to determining that the customization permission information of the first information object fails to match the permission information of the task information.

6. The method according to claim 1, wherein when the permission setting object is the second information object, said displaying the customization permission information corresponding to the permission setting object comprises:
- displaying customization permission information of the second information object.

7. The method according to claim 6, further comprising:
- determining whether the customization permission information of the second information object matches permission information of the task information or permission information of the first information object, in response to an editing operation on the customization permission information of the second information object; and
- displaying a permission lock identifier in an associated region of the second information object, in response to determining that the customization permission information of the second information object fails to match the permission information of the task information or the permission information of the first information object.

8. The method according to claim 1, further comprising:
- displaying a permission lock identifier in an associated region of the task information, in response to customization permission information of the task information comprising no default permission; or
- displaying a permission lock identifier in an associated region of the first information object, in response to customization permission information of the first information object comprising no default permission; or
- displaying a permission lock identifier in an associated region of the second information object, in response to customization permission information of the second information object comprising no default permission.

9. The method according to claim 1, further comprising:
- determining whether customization permission information of each of the first information object and the second information object that correspond to the task information is a default permission, in response to an editing operation on customization permission information of the task information;
- adjusting the customization permission information of each of the first information object and the second information object to be identical to the customization permission information of the task information, in response to determining that the customization permission information of each of the first information object and the second information object that correspond to the task information is the default permission; and
- keeping the customization permission information of each of the first information object and the second information object unchanged, in response to determining that the customization permission information of each of the first information object and the second information object that correspond to the task information is not the default permission.

10. The method according to claim 1, further comprising:
- determining whether customization permission information of the second information object is a default permission, in response to an editing operation on customization permission information of the first information object;
- adjusting the customization permission information of the second information object to be identical to the customization permission information of the first information object, in response to determining that the customization permission information of the second information object is the default permission; and
- keeping the customization permission information of the second information object unchanged, in response to determining that the customization permission information of the second information object is not the default permission.

11. The method according to claim 1, further comprising:
- determining whether customization permission information of each of the first information object and the second information object that correspond to the task information is unmodified, in response to an editing operation on customization permission information of the task information;
- adjusting the customization permission information of each of the first information object and the second information object to be identical to the customization permission information of the task information, in response to determining that the customization permission information of each of the first information object and the second information object that correspond to the task information is unmodified; and
- keeping the customization permission information of each of the first information object and the second information object unchanged, in response to determining that the customization permission information of each of the first information object and the second information object that correspond to the task information is modified.

12. The method according to claim 1, further comprising:
- determining whether customization permission information of the second information object is unmodified, in response to an editing operation on customization permission information of the first information object;
- adjusting the customization permission information of the second information object to be identical to the customization permission information of the first information object, in response to determining that the customization permission information of the second information object is unmodified; and
- keeping the customization permission information of the second information object unchanged, in response to determining that the customization permission information of the second information object is modified.

13. The method according to claim 1, further comprising:
performing an authorization for the task information within a current cycle, based on the customization permission information.

14. The method according to claim 1, further comprising, subsequent to said in response to the trigger operation on the permission setting object of the task information:
displaying one or more permission groups predetermined by a system, and obtaining an authorized target permission group selected from the one or more permission groups; and
adding the target permission group to the permission editing interface displayed subsequent to triggering of the permission customization control,
wherein said displaying the customization permission information corresponding to the permission setting object comprises:
displaying the customization permission information and the target permission group that correspond to the permission setting object.

15. The method according to claim 1, further comprising:
displaying a permission group editing interface, in response to a trigger operation to create a new permission group;
receiving a group name and permission information of group members that are inputted via the permission group editing interface; and
establishing a permission group corresponding to the group name, based on the permission information of the group members.

16. The method according to claim 15, further comprising:
displaying a cyclic permission identifier in an associated region of the permission group, in response to a trigger operation on a cyclic permission control for the permission group; and
authorizing task information within a subsequent cycle for the permission group, based on the cyclic permission identifier.

17. An electronic device, comprising:
a processor; and
a memory having executable instructions of the processor stored thereon,
wherein the processor is configured to perform, when executing read the executable instructions from the memory, and execute the executable instructions to:
display a permission customization control, in response to a trigger operation on a permission setting object, the permission setting object comprising task information and at least one of a first information object and a second information object, the task information, the first information object and the second information being work information having a hierarchical structure, the second information object being subordinate to the first information object, and the first information object and the second information object being subordinate to the task information;
display a permission editing interface, in response to a trigger operation on the permission customization control, and receiving customization permission information via the permission editing interface; and
display the customization permission information corresponding to the permission setting object.

18. The electronic device according to claim 17, wherein said receiving the customization permission information via the permission editing interface comprises:
receiving an organizational attribute and search information that are inputted in the permission editing interface;
querying a predetermined database corresponding to the organizational attribute, to obtain one or more candidate results successfully matched by the search information, and displaying the one or more candidate results; and
obtaining a target result selected from the one or more candidate results and setting permission information corresponding to the target result.

19. The electronic device according to claim 17, wherein when the permission setting object is the task information, said displaying the customization permission information corresponding to the permission setting object comprises:
displaying customization permission information of the task information; or
displaying customization permission information of each first information object of the task information; and/or
displaying customization permission information of each second information object of the task information.

20. A computer-readable storage medium, having a computer program stored thereon, wherein the computer program is configured to perform, when executed by a processor, a permission setting method, comprising:
displaying a permission customization control, in response to a trigger operation on a permission setting object, the permission setting object comprising task information and at least one of a first information object and a second information object, the task information, the first information object and the second information being work information having a hierarchical structure, the second information object being subordinate to the first information object, and the first information object and the second information object being subordinate to the task information;
displaying a permission editing interface, in response to a trigger operation on the permission customization control, and receiving customization permission information via the permission editing interface; and
displaying the customization permission information corresponding to the permission setting object.

* * * * *